April 8, 1924.
H. PEAL
HAY CURING DEVICE
Filed July 20, 1922
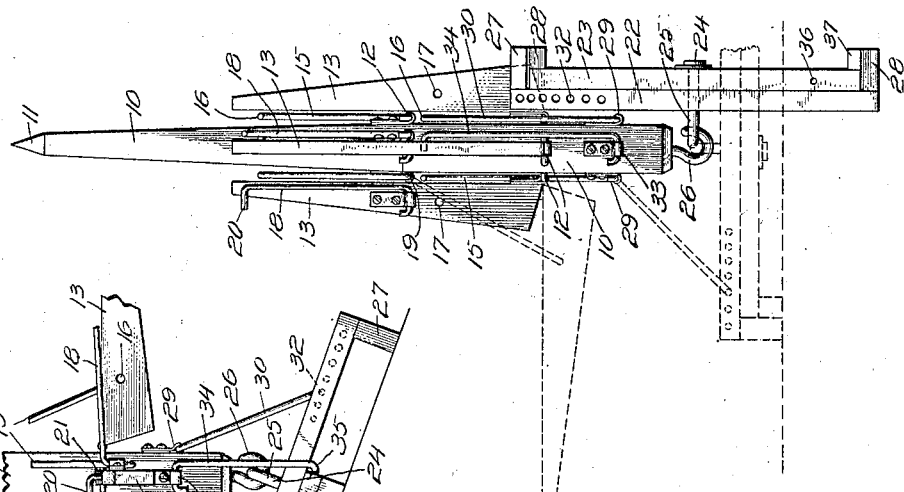
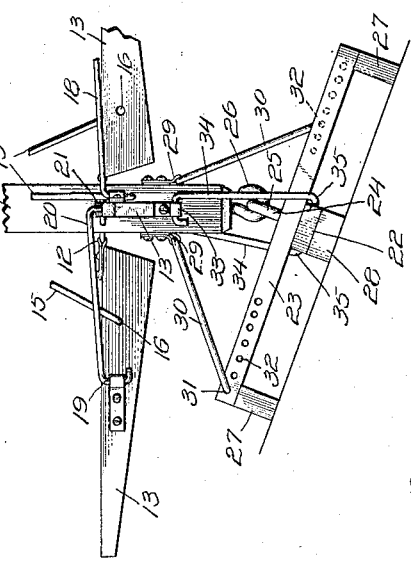
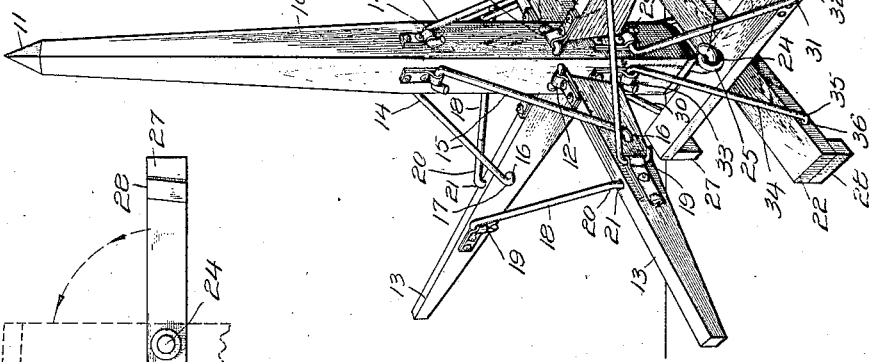
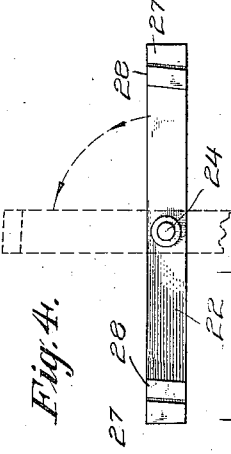
H. Peal. INVENTOR.
BY Geo. P. Kimmel
ATTORNEY.

Patented Apr. 8, 1924.

1,489,962

UNITED STATES PATENT OFFICE.

HARVEY PEAL, OF WICKLIFFE, KENTUCKY.

HAY-CUTTING DEVICE.

Application filed July 20, 1922. Serial No. 576,312.

*To all whom it may concern:*

Be it known that I, HARVEY PEAL, a citizen of the United States, residing at Wickliffe, in the county of Ballard and State of Kentucky, have invented certain new and useful Improvements in Hay-Curing Devices, of which the following is a specification.

This invention relates to devices for curing and drying hay and the like in the field, and has for one of its objects to provide a simply constructed device which may be distended to support a mass of hay spaced from the ground to permit the air to freely circulate beneath it, and which is foldable when not in use or for transportation or storage.

Another object of the invention is to provide a device of this character which may be readily adjusted for use upon sloping ground or on hillsides.

With these and other objects in view the invention consists in certain novel features of construction as hereinafter shown and described and then specifically pointed out in the claims, and in the drawings illustrative of the preferred embodiment of the invention:—

Figure 1 is a perspective view of the improved device arranged for use on level ground.

Fig. 2 is a detail view illustrating the arrangement of parts when used on sloping ground or hillsides.

Fig. 3 is a view of the improved device with the parts collapsed or folded for transportation or storage.

The improved device comprises a supporting standard 10, preferably reduced toward the upper end and pointed as shown at 11.

The standard may be of any required material and of any required length but will generally be of wood and square transversely as shown.

Hingedly coupled at 12 to the side faces of the standard are supporting members 13 which may thus be folded against the standard as shown in Fig. 3 or distended at right angles to the standard as in Figs. 1 and 2.

Connected at 14 to the standard 10 and swinging in a vertical plane are brace rods 15, each rod having a lateral offset 16 at its free end to enter an aperture 17 in the side face of the members 13, and thus support the latter at right angles to the standard, as shown in Figs. 1 and 2, and hold them from vertical movement relative to the standard.

Other rods 18 are hingedly coupled at 19 to the standard and provided with offsets 20 to respectively enter sockets 21 in the upper edges of the members 13, to hold the same from lateral movement relative to the standard and each other.

A foldable foot or base support is provided and comprises coacting members 22 and 23 pivotally united at 24, the pivot being extended at one end into an eye 25 to be engaged by a hook 26 in the lower end of the standard 10.

By this means the foot device is swingingly coupled to the standard and removable therefrom, or adapted to be disposed in parallel relation thereto as shown in Fig. 3.

The members 22 and 23 are provided respectively with supporting blocks 27 and 28 to rest upon the ground and hold the members 22 and 23 spaced from the ground.

The confronting faces of the blocks 27 and 28 are slightly bevelled reversely as illustrated in Fig. 4, so that the member 22 will swing in one direction only, relative to the member 23, as will be obvious.

Swinging at 29 from the standard 10 are brace rods 30 offset at 31 at their free ends to enter one of a plurality of sockets 32 in the side faces of the members 23, as shown in Figs. 1 and 2, and swinging at 33 from the standard 10 are brace rods 34 offset at 35 at their free ends to enter sockets 36 in the member 23.

By this arrangement the members 22 and 23 may be disposed at right angles to each other and at right angles to the standard, as shown in Fig 1, or disposed at an angle to the standard by engaging the offsets 31 of the brace rods 30 in the sockets 32, as shown in Fig. 2, the degree of angularity being controlled by the location of the offsets 31 in the apertures 32.

By this means the foot member may be adjusted to rest upon sloping ground or hillsides, while at the same time the standard 10 may be maintained in a vertical position, and the members 14 in horizontal position, no matter what the slope or incline of the ground may be.

The improved device is simple in construction, can be inexpensively manufactured, and enables a mass of hay or other product to be supported above the ground, and thus providing for the free circulation of air beneath the mass.

When not in use the device may be folded, as shown in Fig. 3, for transportation or storage.

A plurality of the devices may be employed, the number depending upon the size of the field.

The preferred embodiment of the invention may be disclosed in the drawings and set forth in the specification, but it will be understood that modifications within the scope of the claimed invention may be made in the construction without departing from the principle of the claimed invention.

Having thus described the invention what is claimed as new is:—

1. In a device of the class described, a standard, a plurality of supports hingedly connected to the standard and adapted to be folded against the standard or projected laterally at right angles thereto, means for locking the supports in projected position, a supporting foot device, means for swingingly coupling the foot device to the standard, and means for adjustably supporting the foot device relative to the standard, to hold the standard in vertical position when the device is located on sloping ground.

2. In a device of the class described, a standard, a plurality of supports hingedly connected to the standard and adapted to be folded against the standard or projected laterally at right angles thereto, a plurality of rods swingingly secured to the standard and adapted to be engaged respectively with the supports and holding the same from vertical movement, and a plurality of rods adapted to couple the supports and to hold the same from horizontal movement.

3. In a device of the class described, a standard, a plurality of supports hingedly connected to the standard and adapted to be folded against the standard or projected laterally and at right angles thereto, means for locking the supports in projected position, a supporting foot device formed of coacting members pivotally united intermediate their ends and adapted thereby to be disposed either in parallel relation or at right angles to each other, means for swingingly coupling said foot device to said standard, and means for locking said foot device at right angles to the standard.

In testimony whereof, I affix my signature hereto.

HARVEY PEAL.